(12) United States Patent
Ota

(10) Patent No.: US 12,461,578 B2
(45) Date of Patent: Nov. 4, 2025

(54) COMMUNICATION SYSTEM

(71) Applicant: ROHM CO., LTD., Kyoto (JP)

(72) Inventor: Akihiro Ota, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 87 days.

(21) Appl. No.: 18/489,266

(22) Filed: Oct. 18, 2023

(65) Prior Publication Data

US 2024/0045484 A1 Feb. 8, 2024

Related U.S. Application Data

(63) Continuation of application No. PCT/JP2022/018293, filed on Apr. 20, 2022.

(30) Foreign Application Priority Data

Apr. 30, 2021 (JP) .................. 2021-077300

(51) Int. Cl.
| | |
|---|---|
| G06F 1/20 | (2006.01) |
| G06F 1/04 | (2006.01) |
| G06F 1/10 | (2006.01) |
| H04L 7/04 | (2006.01) |

(52) U.S. Cl.
CPC .............. G06F 1/206 (2013.01); G06F 1/04 (2013.01); G06F 1/10 (2013.01); H04L 7/04 (2013.01)

(58) Field of Classification Search
CPC ... G06F 1/206; G06F 1/10; G06F 1/04; H04L 7/04
See application file for complete search history.

(56) References Cited

U.S. PATENT DOCUMENTS

| | | | |
|---|---|---|---|
| 7,761,274 B1* | 7/2010 | Pippin | G06F 11/3058 702/132 |
| 2005/0071705 A1* | 3/2005 | Bruno | G06F 1/206 713/500 |
| 2007/0164832 A1* | 7/2007 | Matsuoka | H03L 7/0996 331/176 |
| 2010/0220827 A1* | 9/2010 | Yanagidate | H03L 7/0805 375/354 |

(Continued)

FOREIGN PATENT DOCUMENTS

| | | |
|---|---|---|
| JP | 2010206373 | 9/2010 |
| JP | 2018120578 | 8/2018 |
| WO | WO 2018173623 | 9/2018 |

OTHER PUBLICATIONS

International Search Report and Written Opinion in International Appln. No. PCT/JP2022/018293, mailed on Jul. 19, 2022, 12 pages (with machine translation).

(Continued)

*Primary Examiner* — Glenn A. Auve
(74) *Attorney, Agent, or Firm* — Fish & Richardson P.C.

(57) ABSTRACT

An asynchronous serial data communication circuit includes a clock signal generator configured to generate a clock signal, a storage configured to store the temperature characteristics of the frequency of the clock signal in a non-volatile manner, and a communicator configured to perform asynchronous serial data communication based on the clock signal and to transmit the temperature characteristics of the frequency of the clock signal stored in the storage.

9 Claims, 7 Drawing Sheets

(56) References Cited

U.S. PATENT DOCUMENTS

| | | | | |
|---|---|---|---|---|
| 2012/0036389 A1* | 2/2012 | Prihadi | ................... | H03L 1/022 |
| | | | | 713/500 |
| 2015/0323957 A1* | 11/2015 | Uppenkamp | ............. | G06F 1/08 |
| | | | | 713/501 |
| 2018/0212786 A1* | 7/2018 | Kamiyama | .............. | G09C 1/00 |
| 2019/0094905 A1* | 3/2019 | Kris | ................... | G01R 19/2506 |
| 2020/0036504 A1 | 1/2020 | Fukumoto | | |
| 2021/0194428 A1* | 6/2021 | Haneda | ................. | G04F 10/005 |

OTHER PUBLICATIONS

JP OA—Japanese Patent Office, Office Action in Japanese Appln. No. 2023-517469, dated Jul. 15, 2025, 7 pages (with English translation).

\* cited by examiner

FIG. 2

| ADDRESS | REGISTER NAME | DESCRIPTION | DATA | FREQUENCY ERROR |
|---|---|---|---|---|
| Ah | M | Frequency error at normal temperature T1 of the clock signal generated by the clock signal generator 10 | 01 | +x% OR MORE BUT LESS THAN +2x% |
| | | | 00 | 0% OR MORE BUT LESS THAN +x% |
| | | | 11 | −x% OR MORE BUT LESS THAN 0% |
| | | | 10 | −2x% OR MORE BUT LESS THAN −x% |
| Bh | H | Frequency error at high temperature T2 of the clock signal generated by the clock signal generator 10 | 0111 | +2y% OR MORE |
| | | | 0001 | +y% OR MORE BUT LESS THAN +2y% |
| | | | 0000 | 0% OR MORE BUT LESS THAN +y% |
| Ch | L | Frequency error at low temperature T0 of the clock signal generated by the clock signal generator 10 | 1111 | −y% OR MORE BUT LESS THAN 0% |
| | | | 1110 | −2y% OR MORE BUT LESS THAN −y% |
| | | | 1000 | LESS THAN −2y% |

| ADDRESS | REGISTER NAME | DATA |
|---------|---------------|------|
| Ah | M | 00 |
| Bh | H | 1111 |
| Ch | L | 1110 |

| ADDRESS | REGISTER NAME | DATA |
|---|---|---|
| Ah | M | 11 |
| Bh | H | 0001 |
| Ch | L | 1111 |

# COMMUNICATION SYSTEM

CROSS-REFERENCE TO RELATED APPLICATIONS

This nonprovisional application is a continuation application of International Patent Application No. PCT/JP2022/018293 filed on Apr. 20, 2022, which claims priority Japanese Patent Application No. 2021-077300 filed in Japan on Apr. 30, 2021, the entire contents of which are hereby incorporated by reference.

BACKGROUND OF THE INVENTION

1. Technical Field

The invention disclosed herein relates to an asynchronous serial data communication circuit, to a sensor module including such an asynchronous serial data communication circuit, to a communication system including such an asynchronous serial data communication circuit, and to an industrial appliance incorporating such a sensor module.

2. Description of Related Art

Conventionally, asynchronous serial data communication has been in practical use (see, for example, WO/2018/173623). In an asynchronous serial data communication circuit, a transmitting side and a receiving side each generate a clock signal. A transmission circuit operates based on the clock signal generated by the transmitting side, and a reception circuit operates based on the clock signal generated by the receiving side. As another type of asynchronous serial data communication different from that disclosed in WO/2018/173623, start-stop synchronous communication is known. With asynchronous serial data communication of the start-stop synchronous type, every time character data corresponding to one character (for example, 8-bit data) is transmitted, transmission and reception are performed with a start bit indicating the start of data transmission added to the head of the character data and with a stop bit indicating the end of data transmission added to the end of the character data.

In asynchronous serial data communication of the start-stop synchronous type, the receiving side detects a start bit transmitted from the transmitting side and acquires data based on the clock signal generated by the receiving side itself. Thus, when, for example, character data corresponding to one character is 8-bit data, if there is a deviation of 5% or more between the frequency of the clock signal generated by the transmitting side and the frequency of the clock signal generated by the receiving side, communication cannot be performed properly.

BRIEF DESCRIPTION OF THE DRAWINGS

FIG. 2 is a diagram showing an example of the temperature characteristics of a clock signal frequency stored in a storage.

DETAILED DESCRIPTION

Figure 1:
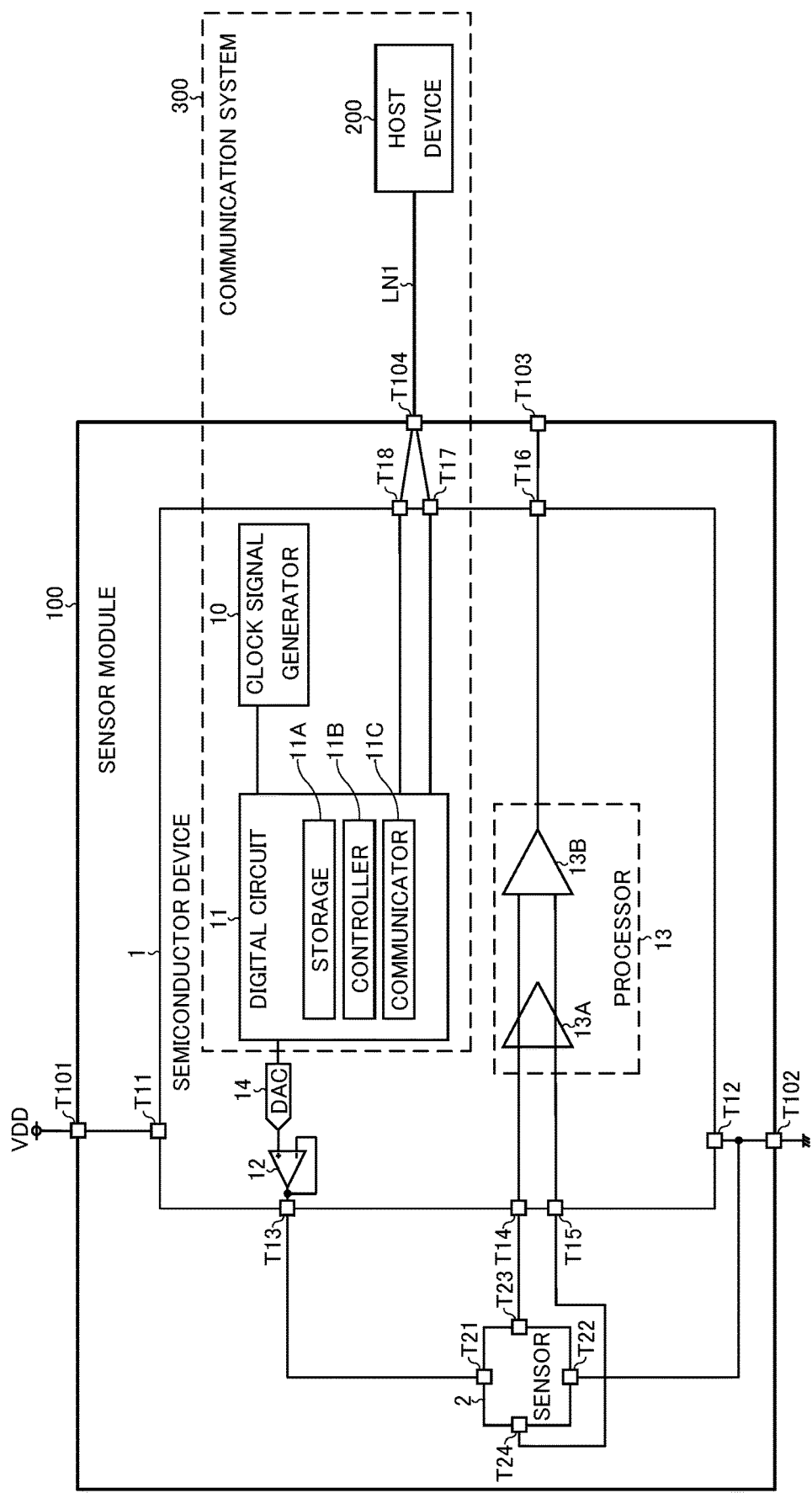
FIG. 1 is a diagram showing an outline configuration of a sensor module according to one embodiment.

FIG. 1 is a diagram showing an outline configuration of a sensor module according to one embodiment. The sensor module 100 shown in FIG. 1 includes a semiconductor device 1, a sensor 2, and terminals T101 to T104.

The semiconductor device 1 is, for example, an LSI (large-scale integration). The semiconductor device 1 includes a clock signal generator 10, a digital circuit 11, a driver 12, a processor 13, a DAC (digital to analog converter) 14, and terminals T11 to T18.

The sensor 2 collects information on a sensing target and converts the collected information into an electrical signal to output it. The sensor 2 includes terminals T21 to T24. There is no particular limitation on the sensing target of the sensor 2. Although there is no particular limitation on the format of the output signal of the sensor 2, in this embodiment, the sensor 2 outputs differential voltage signals.

The terminal T101 is a terminal configured to be fed with a supply voltage VDD, and is physically and electrically connected to the terminal T11 inside the sensor module 100.

The terminal T102 is a terminal configured to be connected to a ground potential, and is physically and electrically connected to the terminals T12 and T22 inside the sensor module 100.

The terminal T103 is a terminal configured to output the output signal of the processor 14, described later, to outside the sensor module 100, and is physically and electrically connected to the terminal T16 inside the sensor module 100.

The terminal T104 is a terminal used for asynchronous serial data communication, and is physically and electrically connected to the terminals T17 and T18 inside the sensor module 100.

The terminals T13 to T15 are physically and electrically connected to the terminals T21, T23, and T24 respectively inside the sensor module 100.

Next, different blocks in the semiconductor device 1 will be described in detail.

The clock signal generator 10 is an oscillation circuit and is configured to generate a clock signal. The clock signal generated by the clock signal generator 10 is fed to the digital circuit 11.

The digital circuit 11 is a circuit for processing a digital signal and processes the digital signal with timing based on the clock signal fed from the clock signal generator 10 to control the operation of the entire sensor module 100. The digital circuit 11 includes a storage 11A, a controller 11B, and a communicator 11C.

The storage 11A is configured to store in a non-volatile manner the temperature characteristics of the frequency of the clock signal. Used as the storage 11A is, for example, an OTP (one-time programmable) memory.

As the temperature characteristics of the frequency of the clock signal stored in the storage 11A, for example, data as shown in FIG. 2 is adopted. In the example shown in FIG. 2, "the frequency error at normal temperature T1 (for example, 50° C.) of the clock signal generated by the clock signal generator 10" is previously written to the address Ah in the storage 11A under the register name M. Also, in the example shown in FIG. 2, "the frequency error at high temperature T2 (for example, 150° C.) of the clock signal generated by the clock signal generator 10" is previously written to the address Bh in the storage 11A under the register name H. Also, in the example shown in FIG. 2, "the frequency error at low temperature T0 (for example, −25° C.) of the clock signal generated by the clock signal generator 10" is previously written to the address Ch in the storage 11A under the register name L.

Figures 3, 4:
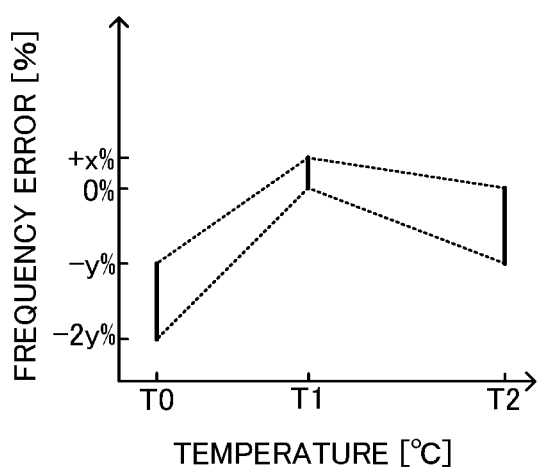
FIG. 3 is a diagram showing a specific example of data stored in the storage.
FIG. 4 is a diagram showing the temperature characteristics of the clock signal frequency corresponding to FIG. 3.

For example, as shown in FIG. 3, when data "00" is written at the address Ah in the storage 11A under the register name M, data "1111" is written at the address Bh in the storage 11A under the register name H, and data "1110" is written at the address Ch in the storage 11A under the register name L, then the temperature characteristics of the frequency of the clock signal stored in the storage 11A are as shown in solid lines shown in FIG. 4. The horizontal axis in the graph in FIG. 4 indicates temperature, and the vertical axis in the graph in FIG. 4 indicates the frequency error of the clock signal (the error from the design value of the frequency of the clock signal).

Figures 5, 6:
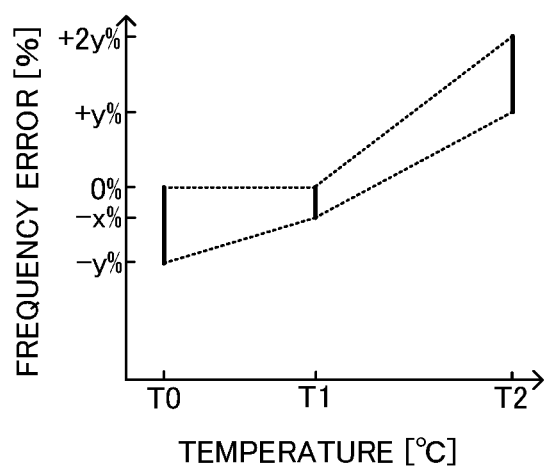
FIG. 5 is a diagram showing another specific example of data stored in the storage.
FIG. 6 is a diagram showing the temperature characteristics of the clock signal frequency corresponding to FIG. 5.

For another example, as shown in FIG. 5, when data "11" is written to the address Ah in the storage 11A under the register name M, data "0001" is written to the address Bh in the storage 11A under the register name H, and data "1111" is written to the address Ch in the storage 11A under the register name L, the temperature characteristics of the frequency of the clock signal stored in the storage 11A are as shown in solid lines shown in FIG. 6. The horizontal axis in the graph in FIG. 6 indicates the temperature, and the vertical axis in the graph in FIG. 6 indicates the frequency error in the clock signal (the error from the design value of the frequency of the clock signal).

Data can be written to the storage 11A, for example, as follows. Before the sensor module 100 is connected to the host device 200, data is input via the communicator 11C from an external device connected to the sensor module 100 and the data is written, under the control of the controller 11B, to the storage 11A.

The communicator 11C performs asynchronous serial data communication of the start-stop synchronous type. The signal transmitted from the communicator 11C is fed via the terminal T18, the terminal T104, and one signal line LN1 to the host device 200. In contrast, the signal transmitted from the host device 200 is received by the communicator 11C via the one signal line LN1, the terminal T104, and the terminal T19. The digital circuit 11, including the storage 11A and the communicator 11C, and the clock signal generator 10 constitute an asynchronous serial data communication circuit. The asynchronous serial data communication circuit constituted by the digital circuit 11 and the clock signal generator 10 constitutes, along with the host device 200, a communication system 300.

The driver 12 is configured to drive the sensor 2. A driving current output from the driver 12 is fed to the terminal T21 of the sensor 2 via the terminal T13.

The processor 13 is configured to process the output signals of the sensor 2. The processor 13 includes a first processor 13A and a second processor 13B.

The first processor 13A is configured to receive and process the output signals of the sensor 2. Specifically, the output signals fed out via the terminals T23 to T24 of the sensor 2 are fed via the terminals T14 and T15 to the first processor 13A. The first processor 13A is a single amplifier, but the first processor 13A is not limited to this; for example, the first processor 13A can be configured with a plurality of amplifiers connected in series.

The second processor 13B is configured to receive and process the output signals of the first processor 13A. The output signal of the second processor 13B is fed via the terminal T16 to the terminal T103. In FIG. 1, the second processor 13B is a single amplifier, but the second processor 13B is not limited to this; for example, the second processor 13B can be configured with a plurality of amplifiers connected in series.

The controller 11B controls the driver 12 via the DAC 14 to correct the output offset of the driver 12.

Figure 7:
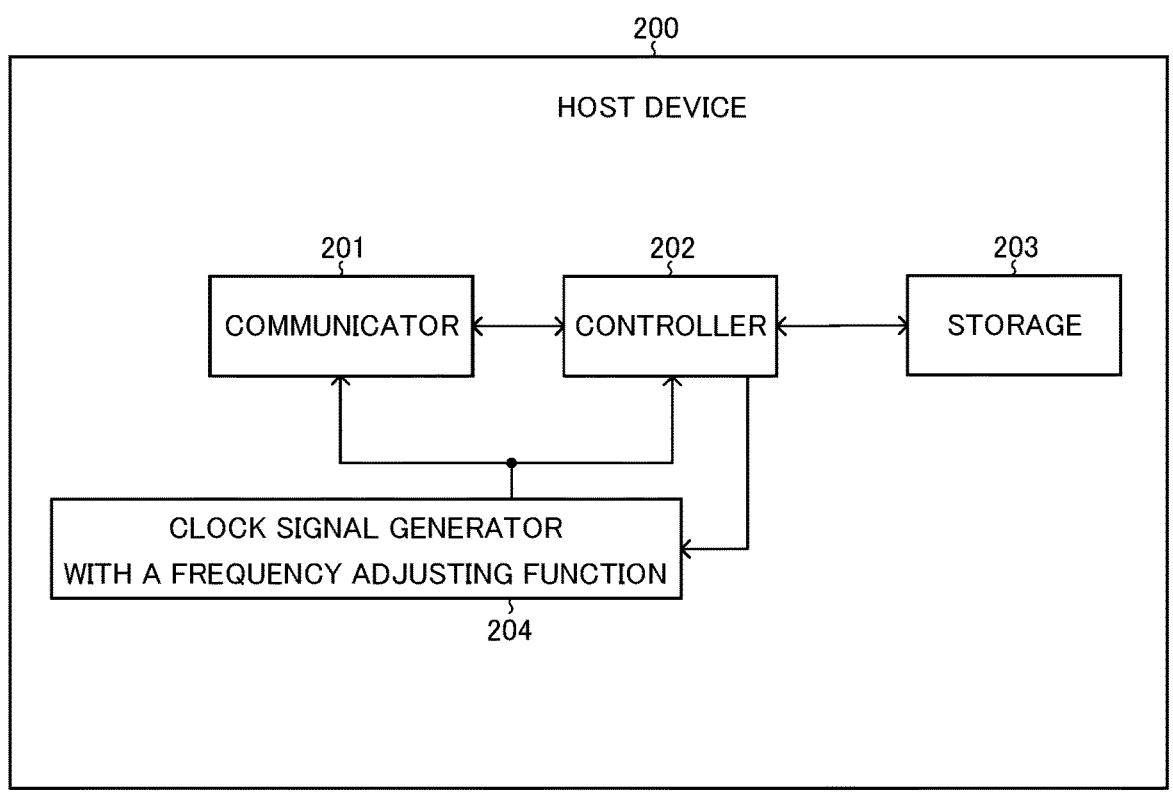
FIG. 7 is a diagram showing an example of an outline configuration of a host device.

Next, the host device 200 will be described. FIG. 7 is a diagram showing an example of an outline configuration of the host device 200. The host device 200 shown in FIG. 7 is a microcomputer with an asynchronous serial data communication function of the start-stop synchronous type.

The host device 200 shown in FIG. 7 includes a communicator 201, a controller 202, a storage 203, and a clock signal generator 204 with a frequency adjusting function (hereinafter referred to as the "clock signal generator 204").

For the controller 202, for example, a CPU (central processing unit) or the like is used. The controller 202 processes a digital signal with timing based on the clock signal output from the clock signal generator 204, and executes a program stored in the storage 203 to control the operation of the entire host device 200. The communicator 201, using the clock signal output from the clock signal generator 204, performs asynchronous serial data communication of the start-stop synchronous type.

The controller 202 controls the clock signal generator 204 to adjust the frequency of the clock signal. For example, when the clock signal generator 204 includes a PLL (phase-locked loop) circuit, the controller 202 controls the frequency division ratio of a frequency divider in the PLL circuit to adjust the frequency of the clock signal.

The controller 202, in accordance with the temperature characteristics of the frequency of the clock signal (the clock signal generated by the clock signal generator 10) transmitted from the sensor module 100, adjusts the frequency of the clock signal (the clock signal generated by the clock signal generator 204).

Specifically, at normal temperature T1 at which normal communication is guaranteed if the frequency of the clock signal generated by the clock signal generator 204 equals the initial value, when the host device 200 transmits to the sensor module 100 a transmission request related to the temperature characteristics of the frequency of the clock signal and the communicator 11C in the sensor module 100 receives the transmission request, the temperature characteristics of the frequency of the clock signal (the clock signal generated by the clock signal generator 10) is transmitted from the communicator 11C to the communicator 201.

For example, in asynchronous serial data communication of the start-stop synchronous type performed between the communicators 11C and 201, when, for example, character data corresponding to one character is 8-bit data, the clock signal generators 10 and 204 are designed such that, at normal temperature T1, there is no deviation of 5% or more between the frequency of the clock signal generated by the clock signal generator 10 and the initial value of the frequency of the clock signal generated by the clock signal generator 204.

An assumed temperature during use is previously stored in the storage 203. That is, the host device 200 previously acquires assumed temperature information.

For example, in asynchronous serial data communication of the start-stop synchronous type performed between the communicators 11C and 201, when, for example, character data corresponding to one character is 8-bit data, the controller 202 controls the clock signal generator 204 such that, at the assumed temperature during use, there is no deviation of 5% or more between the frequency of the clock signal generated by the clock signal generator 10 and the frequency of the clock signal generated by the clock signal generator 204.

When the assumed temperature during use is not high temperature T2 nor low temperature TO, the controller 202 can perform linear interpolation as indicated by the broken lines in FIGS. 4 and 6 to estimate the error in the frequency of the clock signal (the clock signal generated by the clock signal generator 10) at the assumed temperature during use.

As mentioned above, in this embodiment, the frequency of the clock signal (clock signal generated by the clock signal generator 204) is adjusted in accordance with the temperature characteristics of the frequency of the clock signal (clock signal generated by the clock signal generator 10) transmitted from the sensor module 100. In this way, the clock signal generator 10 does not need to be a high-accuracy one; thus, the clock signal generator 10 can be made simple and compact. This helps reduce the size of and the power consumption in the asynchronous serial data communication circuit constituted by the digital circuit 11 and the clock signal generator 10.

There is no limitation on the device or equipment that incorporates the sensor module 100 described above. That is, the sensor module 100 may be incorporated, for example, in industrial appliances or in consumer appliances.

Figure 8:
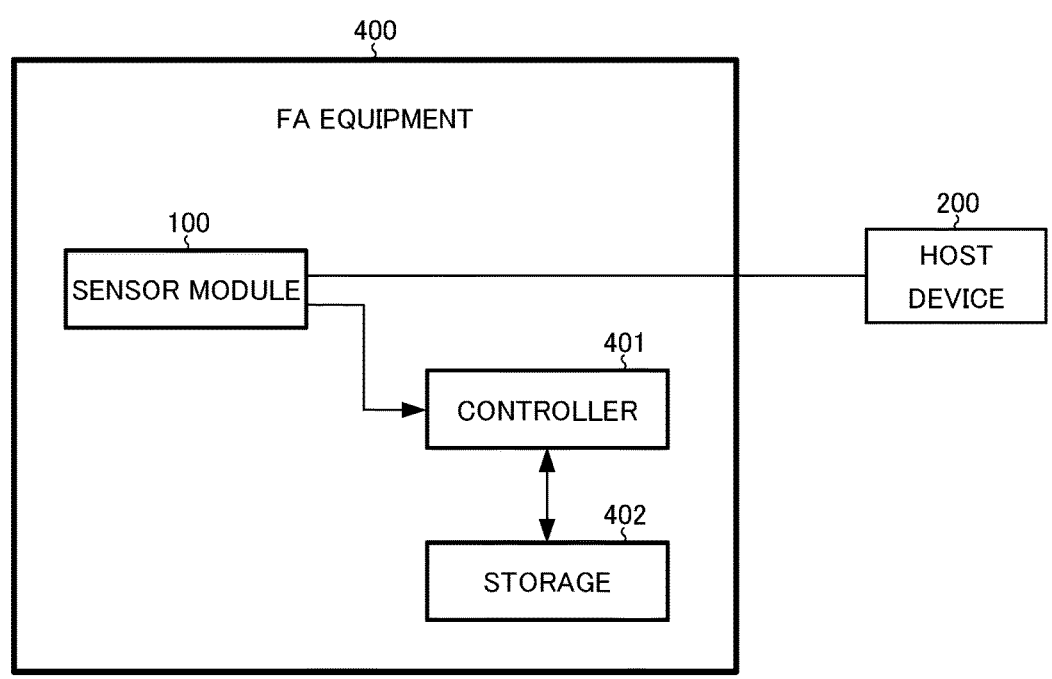
FIG. 8 is a diagram showing an outline configuration of an industrial appliance according to one embodiment.

The sensor module 100 is incorporated, for example, in FA (factory automation) equipment 400 as shown in FIG. 8. That is, the FA equipment 400 includes the sensor module 100. The FA equipment 400 further includes a controller 401 and a storage 402. The controller 401 controls the entire FA equipment 400 based on programs stored in the storage 402. The controller 401 performs various information processing based on the output signal of the sensor module 100. The FA equipment 400 is connected to machinery that constitutes production equipment. Examples of industrial appliances other than FA equipment 400 include solar power generation systems, fuel cell batteries, and the like.

The present invention can be implemented in any manner other than as in the embodiments described above, with any modifications made within the sense of the present invention. The embodiments disclosed herein should be considered to be in every aspect illustrative and not restrictive, and the technical scope of the present invention is defined not by the description of embodiments given above but by the scope of the appended claims and should be understood to encompass any modifications within a sense and scope equivalent to the claims.

Figure 9:
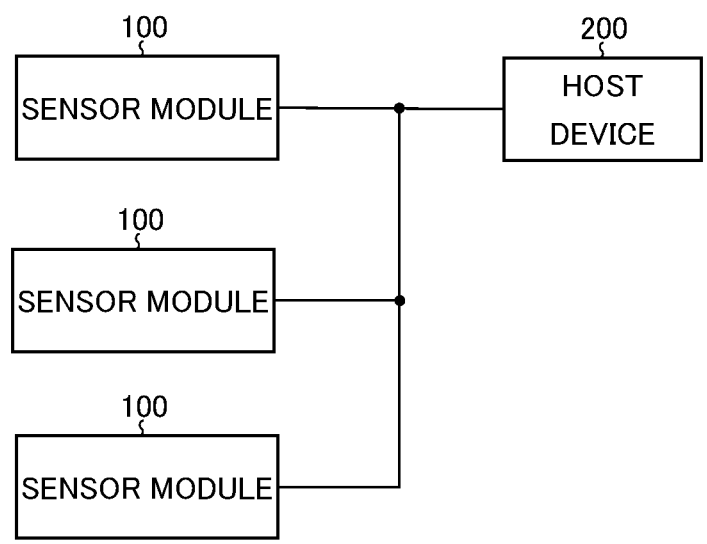
FIG. 9 is a diagram showing the interconnection among the host device and a plurality of sensor modules.

For example, in the embodiment described above, to one host device 200, one sensor module 100 is connected via a single signal line LN1, but, as shown in FIG. 9, a configuration is also possible where, to one host device 200, a plurality of sensor modules 100 are connected each via a single signal line. In the communication system 300 shown in FIG. 1, just one signal line is provided between the sensor module 100 and the host device 200, but there may be provided one signal line for transmitting data from the sensor module 100 to the host device 200 and another signal line for transmitting data from the host device 200 to the sensor module 100.

For example, while, in the embodiment described above, the host device 200 acquires assumed temperature information during use, the host device 200 may instead obtain ambient temperature information. The ambient temperature information may be sensed by a temperature sensor incorporated in the host device 200 or by a temperature sensor externally connected to the host device 200. In this case, the temperature sensor incorporated in the host device 200 or the temperature sensor externally connected to the host device 200 is arranged at a place at the same temperature as the sensor module 100. For example, in asynchronous serial data communication of the start-stop synchronous type performed between the communicators 11C and 201, when, for example, character data corresponding to one character is 8-bit data, the controller 202 can control the clock signal generator 204 such that, at the ambient temperature, there is no deviation of 5% or more between the frequency of the clock signal generated by the clock signal generator 10 and the frequency of the clock signal generated by the clock signal generator 204. In this way, it is possible to ensure, in real time, normal operation in asynchronous serial data communication of the start-stop synchronous type performed between the communicators 11C and 201.

For example, in the embodiment described above, the temperature characteristics of the frequency of the clock signal stored in the storage 11A is information on the relationship of a plurality of different temperatures (for example, normal temperature T1, high temperature T2, and low temperature TO) with the frequency of the clock signal, but it may be information on the relationship of a single temperature (for example, the assumed temperature during use) with the frequency of the clock signal.

For example, control for keeping the driving current for the sensor 2 constant can be achieved by adding a current sense resistor through which the driving current for the sensor 2 passes, converting the driving current for the sensor 2 into a voltage with the current sense resistor, and feeding back a voltage commensurate with the driving current of the sensor 2 to the driver 12.

According to one aspect of what is disclosed herein, an asynchronous serial data communication circuit (10, 11) includes a clock signal generator (10) configured to generate a clock signal, a storage (11A) configured to store the temperature characteristics of the frequency of the clock signal in a non-volatile manner, and a communicator (11C) configured to perform synchronous serial data communication based on the clock signal and to transmit the temperature characteristics of the frequency of the clock signal stored in the storage. (A first configuration.)

The asynchronous serial data communication circuit according to the first configuration described above does not require a high-accuracy clock signal generator; thus, the clock signal generator can be made simple and compact. This helps reduce the size of and the power consumption in the asynchronous serial data communication circuit.

In the asynchronous serial data communication circuit according to the first configuration described above, preferably, the communicator is configured to transmit the temperature characteristics of the frequency of the clock signal stored in the storage upon receiving a transmission request for the temperature characteristics of the frequency of the clock signal. (A second configuration.)

With the asynchronous serial data communication circuit according to the second configuration described above, it is possible to easily acquire the temperature characteristics of the frequency of the clock signal stored in the storage from the asynchronous serial data communication circuit.

In the asynchronous serial data communication circuit according to first or second configuration described above, preferably, the temperature characteristics of the frequency of the clock signal stored in the storage are information on the relationship of a plurality of different temperatures with the frequency of the clock signal. (A third configuration.)

With the asynchronous serial data communication circuit according to the third configuration described above, it is possible to transmit the temperature characteristics of the clock signal in a wide temperature range.

In the asynchronous serial data communication circuit according to first or second configuration described above, preferably, the temperature characteristics of the frequency of the clock signal stored in the storage are information on the relationship of a single temperature with the frequency of the clock signal. (A fourth configuration.)

With the asynchronous serial data communication circuit according to the fourth configuration described above, it is possible to suppress the amount of transmitted information on the temperature characteristics of the frequency of the clock signal.

According to another aspect of what is disclosed herein, a sensor module (100) includes a sensor (2) and a semiconductor device (1). The semiconductor device includes a driver (12) configured to drive the sensor, a processor (14) configured to process the output signal of the sensor, and the asynchronous serial data communication circuit according to any of the first to fourth configurations described above. (A fifth configuration.)

With the sensor module according to the fifth configuration described above, it is possible to reduce the size of and the power consumption in the asynchronous serial data communication circuit.

According to yet another aspect of what is disclosed herein, a communication system (300) includes a first communication circuit (200) and a second communication circuit connected together via a signal line. The first communication circuit is configured to adjust the frequency of the clock signal generated in the first communication circuit. The second communication circuit is the asynchronous serial data communication circuit according to any of the first to fourth configurations described above or the asynchronous serial data communication circuit included in the sensor module according to the fifth configuration described above. (A sixth configuration.)

With the communication system according to the sixth configuration described above, it is possible to reduce the size of and the power consumption in the asynchronous serial data communication circuit.

In the communication system according to the sixth configuration described above, preferably, the first communication circuit is configured to acquire assumed temperature information during use and to adjust the frequency of the clock signal generated in the first communication circuit in accordance with the assumed temperature information during use. (A seventh configuration.)

With the communication system according to the seventh configuration described above, it is possible to guarantee normal communication at the assumed temperature during use.

In the communication system according to the sixth configuration described above, preferably, the first communication circuit is configured to acquire ambient temperature information and to adjust the frequency of the clock signal generated in the first communication circuit in accordance with the ambient temperature information. (An eighth configuration.)

With the communication system according to the eighth configuration described above, it is possible to guarantee normal communication at the ambient temperature.

According to still another aspect of what is disclosed herein, an industrial appliance (400) includes the sensor module according to the fifth configuration described above. (A ninth configuration.)

With the industrial appliance according to the ninth configuration described above, it is possible to reduce the size of and the power consumption in the asynchronous serial data communication circuit.

The invention claimed is:

1. A communication system comprising a first communication circuit and a second communication circuit connected together via a signal line,
wherein
the first communication circuit is configured to adjust a frequency of a first clock signal generated in the first communication circuit,
the second communication circuit is an asynchronous serial data communication circuit, and the asynchronous serial data communication circuit comprises:
a clock signal generator configured to generate a second clock signal;
a storage configured to store temperature characteristics of a frequency of the second clock signal in a non-volatile manner; and
a communicator configured
to perform asynchronous serial data communication based on the second clock signal and
to transmit the temperature characteristics of the frequency of the second clock signal stored in the storage.

2. The communication system according to claim 1,
wherein
the communicator is configured to transmit the temperature characteristics of the frequency of the second clock signal stored in the storage upon receiving a transmission request for the temperature characteristics of the frequency of the second clock signal.

3. The communication system according to claim 1,
wherein
the temperature characteristics of the frequency of the second clock signal stored in the storage are information on a relationship of a plurality of different temperatures with the frequency of the second clock signal.

4. The communication system according to claim 1,
wherein
the temperature characteristics of the frequency of the second clock signal stored in the storage are information on a relationship of a single temperature with the frequency of the second clock signal.

5. The communication system according to claim 1,
wherein
the first communication circuit is configured
to acquire assumed temperature information during use and
to adjust the frequency of the first clock signal generated in the first communication circuit in accordance with the assumed temperature information during use.

6. The communication system according to claim 1,
wherein
the first communication circuit is configured
to acquire ambient temperature information and to adjust the frequency of the first clock signal generated in the first communication circuit in accordance with the ambient temperature information.

7. A communication system comprising first and second communication circuits connected together via a signal line, wherein
the first communication circuit is configured to adjust a frequency of a first clock signal generated in the first communication circuit, and
the second communication circuit is an asynchronous serial data communication circuit included in a sensor module,
wherein the sensor module comprises a sensor, storage, and a semiconductor device,
wherein the storage is configured to store temperature characteristics of a frequency of a second clock signal, and
wherein the semiconductor device includes:
a driver configured to drive the sensor;
a processor configured to process an output signal of the sensor; and
the asynchronous serial data communication circuit.

8. The communication system according to claim 7, wherein
the first communication circuit is configured
to acquire assumed temperature information during use and
to adjust the frequency of the first clock signal generated in the first communication circuit in accordance with the assumed temperature information during use.

9. The communication system according to claim 7, wherein
the first communication circuit is configured
to acquire ambient temperature information and
to adjust the frequency of the first clock signal generated in the first communication circuit in accordance with the ambient temperature information.

* * * * *